Figure 1:
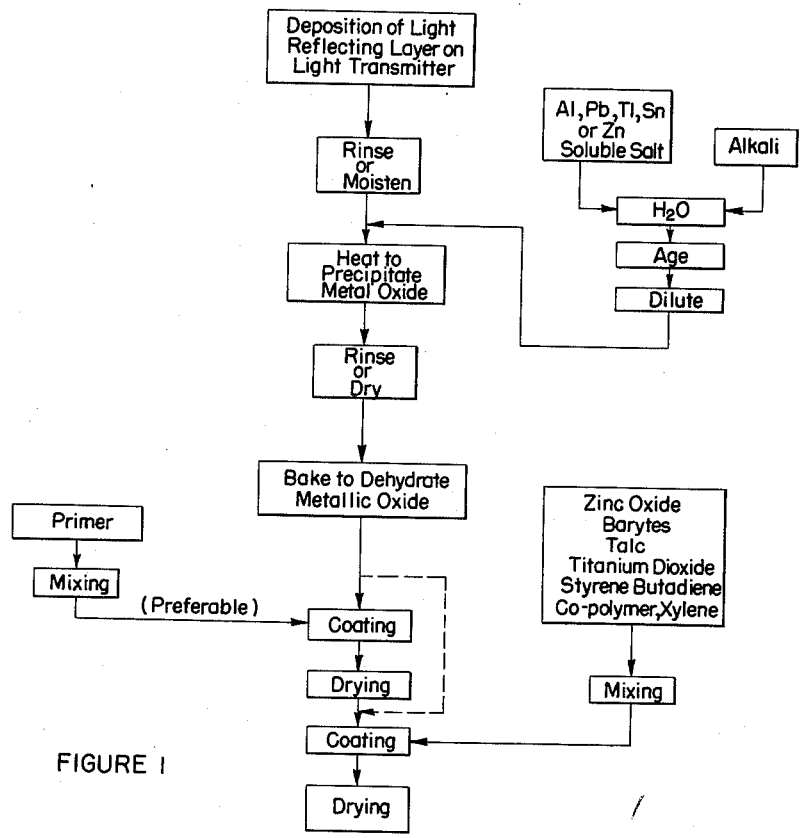

May 6, 1952

L. D. McGRAW ET AL 2,595,800

COMPOSITE BACKING FOR MIRRORS

Filed May 25, 1950

INVENTORS.
Leslie D. McGraw
Charles L. Faust
Ernest R. Mueller
BY
AGENTS.

Patented May 6, 1952

2,595,800

UNITED STATES PATENT OFFICE 2,595,800

COMPOSITE BACKING FOR MIRRORS

Leslie D. McGraw, Charles L. Faust, and Ernest R. Mueller, Columbus, Ohio, assignors, by mesne assignments, to Ohio Plate Glass Company, Toledo, Ohio, a corporation of Ohio Application May 25, 1950, Serial No. 164,057

7 Claims. (Cl. 88—105)

The present invention relates to protective coatings for mirrors. More particularly, it relates to a method or process for protectively coating mirrors and to the protectively-coated mirrors per se.

It is well known to those skilled in the art of producing silver mirrors that the thin silver film itself possesses very poor resistance to deterioration as result of exposure under the conditions of its normal domestic and industrial use. In order to retain the initially good reflecting quality and color of the silver film on the glass, a protective material is required upon the exposed surface of the silver. Many different combinations of backing materials have been described in the art, each being directed toward prolonging the appearance and reflectivity of the mirror.

One of the most important conditions that affects the usefulness of a silver mirror is moisture in the atmospheric air which contacts it. While silver itself is somewhat resistant to many acids and salts, particularly in a dry atmosphere, the usual atmospheric gases contain moisture and sulphurous gases which rapidly attack the silver film or the glass-silver interface causing deterioration or loosening of the silver. Hence, the purpose of a protective backing is to exclude such gases.

In addition to a number of different organic-type protective backings for silver mirrors, the use of electroplate has been proposed; for example, a copper electroplate (U. S. Patents Re. 33,721 and 1,999,529), a lead electroplate (U. S. Patent 2,113,977), and nickel-cobalt or other white metal electroplate (U. S. Patent 1,977,639). In particular, electro-copper has found industrial use as a protective mirror backing. Since the protection offered by such metallic coatings is limited due to their tendency to oxidize, they, in turn, must also be protected by organic coatings applied over them. Additionally, metallic backings on the silver mirror also require special operations or techniques of application which are time-consuming, need careful control, and subject the silver film to cathodic hydrogen even though the plating bat is very efficient. Cathodic hydrogen under conditions other than those closely controlled can easily damage the silver on the glass.

The increasing interest for using silvered mirrors, particularly flat plate glass mirrors, in outdoor exposure conditions, places even more stringent requirements on backing materials to protect the quality of the mirror film. In addition to the atmospheric elements that would attack such mirrors, the practice of mounting them with mastic introduces another material that can cause deterioration of the mirror through acids or other corrosive materials retained by the mastic or occurring through long-time oxidation of the mastic itself. Satisfactory resistance to mastic has not been realized with mirror backings heretofore. Moreover, some of the materials customarily used as backings for the metallic reflecting layer or metallic protective layer crack and pit on aging, permitting the atmospheric gases to penetrate through to the silver causing deterioration thereof.

In industry, it is the customary practice to produce mirrors cut from glass in the commercial and retail sizes ultimately to be used. It is not the customary practice to prepare mirrors in large sheets which are then cut to size although this would generally be preferable and it would be essential that, during such a cutting process, the protective backing materials not adhere to the cutting tool but break sharply with the glass without flaking or peeling of the silver film from the glass base or of the backing from the silver. Likewise, when the edges of the mirror are finished or polished, the protective backing should wear away readily and should not cause the silver film to pull away from the edge. Another desirable feature in a commercial mirror backing is that it be sufficiently hard and tough to resist scratching or marring during assembling, handling and mounting. A still further property of a good mirror backing relates to its ability to prevent deterioration of the silver if there is an accidental scratch through the backing which exposes a small area of the silver. These properties have not heretofore been obtained adequately with backings that are available today without high cost of mirror manufacture. Hence, it would be highly desirable to not only provide a tough, readily-friable, moisture-impervious, non-corrosive, and adherent mirror backing, but also to provide such a backing at economical cost.

It is, therefore, an important object of the present invention to provide a method or process for protectively coating a mirror, the resulting coating characterized by being adherent and by protecting the reflecting film from flaking, peeling, scratching, oxidation, moisture penetration and other deterioration over a relatively long period of time.

It is another object of this invention to provide a mirror having an adherent scratch- and mar-resistant, non-flaking and non-peeling backing which also materially increases the life of the mirror by protecting the reflecting surface against attack by atmospheric gases and other deterioration.

It is a further object of this invention to provide a method for applying a composite or laminated protective coating to a mirror, said coating affording protection against adverse handling, oxidation, and other deterioration.

It is a still further object of this invention to provide a mirror having a composite or laminated backing which affords protection against adverse handling, oxidation and other deterioration.

Figure 2:
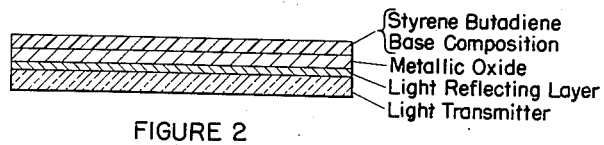
Figure 3:
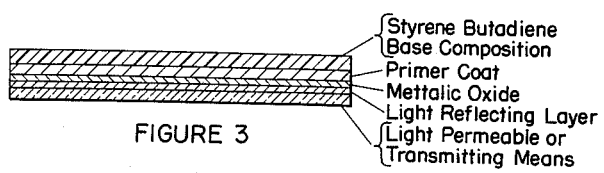

These and other objects and advantages of the present invention will become more apparent from the following detailed description, example, and drawing, wherein Figure 1 is a flow sheet of the method or process disclosed herein, and Figure 2 is a vertical cross-sectional view of a mirror containing a protective backing comprising a metallic oxide layer disposed between the reflecting surface and the outer styrene-butadiene base composition layer, and Figure 3 is a vertical cross-sectional view of a preferred embodiment of the mirror of this invention wherein a primer layer is disposed between the metallic oxide layer and the outer styrene-butadiene base composition coating.

It has now been found that the life of a mirror can be materially prolonged against atmospheric attack, deterioration, handling, etc., by combining a baked metallic oxide film deposited from an aged, diluted and warmed aqueous alkaline metallic salt solution directly onto the back of the reflecting film of the mirror with an outer coating of a butadiene-styrene base composition on the oxide layer. In a preferred form of the invention a primer coating is disposed between the oxide film and the outer butadiene-styrene base composition. Moreover, such mirrors can be readily cut and edge-polished without flaking and peeling.

In general, with reference to the drawing, Figures 1 to 3, an alkaline soluble metallic salt is mixed with an alkali and dissolved in water. The resulting solution is then aged for a relatively short period of time, diluted and used to cover the silvered surface of a mirror or other light-reflecting material. The solution is heated or warmed to cause a fine oxide and/or hydroxide precipitate to occur on the metallized surface of the mirror, and when deposition is complete (a flocculent precipitate usually appears in the solution at this time), the solution is dumped. The mirror is then rinsed, dried and baked for a short time to eliminate any water of hydration and convert the metallic hydroxide to a metallic oxide. Following this, a composition containing zinc oxide, barytes, talc, titanium dioxide, styrene-butadiene co-polymer, and xylene is sprayed onto the mirror, followed by a short air-drying period. Previous to the deposition of the organic coating a primer coat comprising vinyl butyral resin, basic zinc chromate, talc, isopropanol, toluene, water and phosphoric acid can also be preferably spraying onto the inorganic precipitated film to increase somewhat the life of the mirror and the adherence of the outer organic coating as well as its moisture-resistant qualities.

The mirror to be protected in the manner disclosed herein may be made by any method. It is preferred to make the mirror by the Rochelle salt chemical-reduction method, because it produces a thin, rather perfect film of silver which is highly reflective and adherent to the glass. However, metal-reflecting or semi-reflecting films can be applied by vacuum deposition, castings, induction melting, melting and puddling, dipping, sputtering, sublimation, and spraying. Moreover, the light-reflecting layer need not be silver but can be of any metal, for example, thin copper, platinum and gold layers, which have the property of reflecting light and which, under normal conditions of handling, manufacture, and exposure would be subject to oxidation, deterioration, loosening, peeling, blistering, or other harm. Furthermore, the light-permeable or transmitting layer is not restricted to glass but can be quartz, Lucite, cellophane, or any semi- or selectively-transparent or fully-transparent material which is not adversely affected by a temperature up to 120° C. It is, thus, seen that, while the light-reflecting material has been described as a mirror, in general, reflectors and other light-reflecting means, semi- or selectively-reflecting, can be protected according to the teaching of this invention.

The soluble metallic salts of this invention are aluminum, lead (valence 2), thallium (valence 1), tin (either valence 2 or 4) or zinc acetate, chlorate, chloride, glycolate, nitrate, oxide, perchlorate, phosphate, sulfate and tartrate salts soluble in alkaline solutions. It, however, is preferred to use zinc oxide or chloride as the soluble salt and the present invention will be particularly described with reference to zinc oxide although it is not intended to be limited thereby.

Sodium hydroxide is the alkali mixed with the soluble salt. Cesium, lithium, potassium, or rubidium hydroxides can be used to replace the sodium hydroxide. Moreover, for the purposes of this invention ammonium hydroxide will be considered an alkali or an equivalent of the other alkali hydroxides and can be used in the practice of this invention.

The ratio of the soluble metallic salt to the alkali is from 8 to 17 per cent by weight of the salt to from 83 to 92 per cent by weight of the alkali based on their dry weights. It has been found best to use about 12 per cent by weight of salt with the balance being alkali. The mixture of the salt and alkali compounds is then added to a large volume of water in a ratio of about 225 grams of the mixture to from about 0.5 to about 1.5 kilograms of water, although about 1 kilogram is preferable.

Still further wide variations in the alkali to salt ratio will also result in useful solutions. In general the greater this ratio, the greater must be the final dilution of the solution to result in hydrolysis in the optimum temper-range for good adherence. It will be understood that the stable metallate solution containing an excess of alkali of this invention can be so diluted as to form the protective film under discussion when heated to the optimum temperature range. If the alkali to salt ratio differs from that disclosed above, careful preparation of solution and subsequent aging and dilution will not provide a solution which, on heating, will deposit an adherent continuous layer on the reflecting film that on final drying and baking will give the properties desired herein. In such cases it has also been observed that a precipitate may not form or may only form at temperatures which endanger the reflective film.

After preparation, the water solution of metallic salt and alkali must be allowed to age for from 1 to 3 weeks. About two weeks' aging is satisfactory for most purposes. While it is desirable to age the solution in tightly stoppered bottles, it may be performed in beakers or containers loosely covered to prevent foreign particles like dirt and dust from collecting in the solution. It is not precisely understood why the aging step is critical. However, if it is omitted a precipitate will not form in the desired temperature range on the silvered back, or if a precipitate does form, it will form in the solution and not adhere to the silver film properly to result in an adherent protective coating on the metal. For example, where zinc chloride or oxide is used with sodium hydroxide it may be that some complex zinc or zinc silicate salt forms or hydrolysis occurs during the aging step that is conducive to the deposition of the zinc oxide-zinc hydroxide $$(Zn(OH)_2 + ZnO)$$

coating in the right chemical and physical condition on dilution and heating.

After aging the solution is diluted with water to from 5 to 20 times its original volume. Excellent results have been obtained with dilutions of eight times its original volume. In order to keep the temperature of precipitation relatively low, since hydrolysis temperature depends on dilution, it is necessary to dilute the mixture by at least 5 times its original volume. Otherwise, it would be necessary to resort to high temperatures to cause precipitation which would damage the reflective film on the mirror as such coatings are particularly sensitive to high temperatures in the presence of strong caustic. Also, at high temperatures the protective film tends to redissolve. If the original solution is diluted in excess of 20 times its original volume, the protective coating will be too thin and powdery and will contain pin holes, destroying its usefulness, and, hence, this represents an upper limit.

It will be appreciated that dilution of the solution should be made at about the time a precipitate is to be formed on the silver film of the mirror and that the solution must not be diluted appreciably more than described above, for if the solution is too dilute a non-adherent precipitate will form in the solution at room temperature before it can be heated to the operating range. Thus, if dilution is performed as described supra immediately before the heating-precipitation step is undertaken the solution is not too dilute and the precipitate will not form at room temperatures but only in the preferred range.

After the solution has been diluted, a portion is immediately used to cover the reflective film of the mirror either dry or preferably still wet with rinse water from the silvering step. The mirror is placed on a table as in common silvering practice. If the Rochelle process is not used for silvering, the mirror should be rinsed with water or wetted preparatory to covering it with the aged and diluted solution.

The solution and/or mirror is then quickly heated to a relatively low temperature to cause the precipitate to form on the silver film. The solution must not be heated too slowly or the precipitate will form prematurely at a low temperature and not adhere to the silver film on baking and, moreover, a high temperature is to be avoided since it will cause the precipitate to re-dissolve. While not absolutely necessary, the solution can be agitated, for example, with a stream of air or carbon dioxide. Care must be exercised when employing $CO_2$ since it will neutralize somewhat the alkali present, and while advantage can be taken of the fact that this will cause the precipitate to form at lower temperature as a result of some neutralization, the precipitate may not adhere to the metal-reflecting layer. Alternatively, if desired, mechanical agitation or shaking can be employed while a solution of sodium bicarbonate (25 g. per 100 cc.) is added thereto. In any case, whether or not carbon dioxide or carbonate is added, the pH of the resulting solution should remain on the basic side. The solution and/or mirror can be heated in a number of ways although it is preferred to either heat it with infrared ray lamps or to play steam or hot water on the underside of the mirror or on sides of the container. As the temperature is increased preferably from about 55 to about 60° C., although temperatures up to 70° C. can be used, an adherent tan to white deposit forms on the silver film sometimes accompanied by a fine white precipitate in the solution. As soon as a flocculent precipitate appears in the solution in this temperature range or at a predetermined earlier time, the mirror containing the precipitate thereon should be removed from the solution. In general, the overall time of precipitation will take about 3 to 8 minutes. Instead of covering the mirror with a solution, the mirror can be placed in a tank with the solution.

After the precipitate has formed on the silver film surface, the mirror is removed from the bath, rinsed to remove excess solution containing alkali, dried in air and baked at about 120° C. for from 15 to 60 minutes to remove any water of hydration and convert the metallic hydroxide to metallic oxide, possibly also to cause some chemical or physical union of the metallic oxide to the silver backing, since the metallic oxide layer after baking is very tenaciously attached to the silver film. The adherence of the metal-reflecting surface to the glass is also improved by the baking. While baking can be performed in inert or other noninjurious atmospheres to avoid any possibility of atmospheric contamination, it is not essential. The baking temperature, however, should not exceed 130° C. to avoid uneven expansion between the protective coating, reflective film, and glass which may cause blistering or peeling. Furthermore, prolonged heating above 130° C. will recrystallize the silver when it is used and render it translucent. The final baked coating will have a thickness of from 0.005 mil upwards which provides the necessary protective covering. Thicker coatings can be obtained, of course, by repeating the procedure as often as desired.

Subsequent regeneration of the metallic oxide-film coating solution does not appear practical after it has once been used since it is so dilute. The cost of materials lost by discarding the dilute solution after each use is negligible.

It is not precisely known why the components of the outer organic base protective layer in combination with the zinc salt film provide such a good backing. However, it has been found that outside certain ranges or proportions, the composition will not provide the necessary protection, hardness, abrasion resistance, and edge-cutting properties as taught by the present invention. The critical ranges for the components of the outer coating are zinc oxide in an amount of from 13 to 33 parts by weight, barytes in an amount of from 16 to 40.5 parts by weight, talc from 3.0 to 15.5 parts by weight, titanium dioxide from 6.0 to 11.5 parts by weight, styrene-butadiene co-polymer in an amount of from 25 to 32 parts by weight, and sufficient xylene to give good flowability or viscosity for readily applying coatings by painting, spraying, etc., at time of mixing.

The amount of xylene used will vary depending on the fluidity or viscosity desired during mixing and spraying and is generally used in the ratio of from 60 to 120 parts by weight of xylene to about 30 to 60 parts by weight of the mixture of dry ingredients. Aryl hydrocarbons similar to xylene, such as toluene and benzene can be substituted partially or wholly for the xylene.

A representative outer protective composition contains 16 parts by weight of zinc oxide, 25.7 parts by weight of barytes, 3.2 parts by weight talc, 6.1 parts by weight of titanium dioxide, 26.3 parts by weight of styrene-butadiene copolymer, and 136 parts by weight of xylene. Xylene is usually first added to the styrene polymer followed by addition of the other ingredients. Additional xylene is added as needed to vary the viscosity and enable the composition to be readily sprayed. This composition produced an excellent backing in combination with the chemically precipitated baked metallic oxide layer when applied to mirrors. This outer organic backing material after evaporation of the xylene should range in thickness from 0.5 to 1.0 mil to provide sufficient bulk to resist wear in handling as well as to avoid any pin-holing from shrinkage on drying.

A primer coat is desirably applied to the zinc oxide film prior to the application of the outer protective backing. Any primer coating customarily employed to secure paint films to metallic surfaces can generally be used. It will increase somewhat the moisture resistance and adherence of the outer protective coating. It is sprayed or otherwise applied onto the metallic oxide film, as described supra with respect to the outer protective backing, in thicknesses of from .05 to 0.3 mil. However, a preferred composition for use as a primer with the outer organic composition and which improves the life of the mirror has been found to be as follows:

| Components | Parts by Weight |
|---|---|
| A. Base Grind: | |
| Vinyl Butyral resin XYHL (polyvinyl butyral resin as manufactured by the Bakelite Co.) | 7.2 |
| Basic zinc chromate pigment or zinc tetroxy chromate (M1828, Mineral Pigment Corp. or 2259, Imperial Paper and Color Co.) | 6.9 |
| Talc (Asbestine 3X) | 1.1 |
| Isopropanol (99%) | 50.4 |
| Toluene | 14.4 |
| B. Acid Diluent: | |
| Water | 3.4 |
| Isopropanol (99%) | 13.2 |
| Phosphoric acid (85%) | 3.4 |

The above ingredients are mixed prior to use. The mixture should, however, be reduced for application within eight to twelve hours after preparation before polymerization or excessive evaporation of solvent and diluent, e. g., water, isopropanol and toluene has taken place. It is obvious that the proportions can be varied somewhat to still obtain desirable adherence and moisture-resistance properties which are necessary in helping to prevent deterioration of the silver film.

Conventional paint or rubber-mixing machinery can be used to readily mix or combine the ingredients of the primer as well as the outer coating. Examples thereof are ball mills, three-roll paint mills, and so forth. Mixing is discontinued at the time homogeneous-appearing compositions are obtained, which is in from 20 to 40 minutes. The mixing times will, of course, vary with the size of the equipment and amount of materials used.

Customary paint-spraying equipment can readily be used to apply the primer and outer organic-base coatings. It is unnecessary to use special paint-spraying machinery or techniques in order to coat the mirror with the composition primer and outer coatings disclosed herein. Moreover, deposition of the coatings is not limited to spraying but they can be readily applied by roller-coating, dipping, brushing, and so forth.

The air-drying and hardening step to enable the volatiles (toluene, isopropanol, water and xylene) to evaporate and the polymers or resins to set may be done in the open atmosphere at room temperature. It is not essential that the primer and outer coatings be dried in a stream of hot inert gas or heated, although such procedure can be utilized to materially reduce the time of drying. While the organic coatings are dry in about 45 minutes in air, they are not sufficiently hard for several hours. For example, it will take from about 12 to about 24 hours to properly dry and harden the coatings in air at room temperature while only from 30 to 60 minutes when baking at from 75 to 100° C. Where a primer coat is used, it must be allowed to dry and set before the outer or organic coating is applied.

It is, of course, apparent that the thicknesses of the organic base primer and/or outer coatings can be increased as desired by spraying, etc., for longer times or by repeating the procedures.

While it is not essential, it is, of course, highly desirable that the materials used in the practice of the present invention be substantially pure in order to obtain consistent results.

The following example will serve to illustrate the invention with more particularity to those skilled in the art.

3.45 ounces of zinc oxide and 26.55 ounces of sodium hydroxide, dry weight, were added to one gallon of water. After aging for two weeks protected from the atmosphere, the solution was diluted to eight times its original volume. A portion of the solution was then poured onto the wet silvered surface of a mirror which had been produced by means of the Rochelle salt process and rapidly heated to from 55 to 60° C. by infrared lamps. The solution became cloudy and a fine white adherent precipitate formed on the mirror back. The coating appeared tan when viewed by transmitted light from the underlying silver. When a flocculate precipitate appeared in the solution in this temperature range after about five minutes, the mirror containing the fine tan coating thereon was removed from the solution. The coating was rinsed, dried in air, and baked in an oven at 120° C. under an air atmosphere for about 30 minutes. X-ray analysis of the unbaked coating disclosed that it was a mixture of zinc hydroxide and zinc oxide while the baked coating showed the presence of only zinc oxide. The zinc oxide coating was approximately 0.005 mil thick. Next, a primer coat was prepared by mixing together 7.2 parts by weight of vinyl butyral resin XYHL, 6.9 parts by weight of basic zinc chromate, 1.1 parts by weight of asbestine, 50.4 parts by weight of isopropanol (99%) and 14.4 parts by weight of toluene. This mixture was then diluted with 3.4 parts by weight of water, 13.2 parts by weight of isopropanol (99%) and 3.4 parts by weight of 85% phosphoric acid. The mixture was sprayed onto the zinc salt precipitate to produce a coating of about 0.1 mil thick. The primer coating was allowed to air-dry and then the outer organic coating was applied by spraying. The outer organic coating was prepared by mixing together in a three-roll mill for 35 minutes until a homogeneous-appearing composition was obtained, 14 parts by weight of acicular zinc oxide meeting Maritime Commission Specification 25–MC–520, 16 parts by weight of medium oil absorption barytes (approximately 99% $BaSO_4$—0.1 to 0.025% retained on 325 mesh screen), 8 parts by weight of high oil-absorption talc (1.2 to 1.3% retained on 325 mesh screen), 6.5 parts by weight of rutile titanium dioxide (95% $TiO_2$ meeting Federal Specification TT–T–425, Type III, Class B), and 25 parts by weight of styrene-butadiene co-polymer (Pliolite S–5 as made by the Goodyear Tire and Rubber Company, 70 to 75% styrene). 106 parts by weight of xylene was added to the styrene polymer prior to the addition of the other components of the outer organic coating. After 24 hours in air at room temperature, the outer organic coating was dry. It was 0.9 mil thick.

Other silvered mirrors were treated in a manner similar to the above except that one or more coatings were eliminated. For example, one mirror was treated only with the zinc coating, another was treated with a coating of shellac on the silver, and another mirror was treated only with the zinc layer and the organic layer, and a still further mirror was treated only with the organic coating. These mirrors were all tested under accelerated aging conditions and the results are shown below.

Test I

A mirror containing the combination backings on silver of zinc oxide, primer coat, and butadiene-styrene base outer coating withstood 100% relative humidity at 125° F. for up to 25 days or more without any sign of loss of reflectivity.

Test II

A mirror containing the zinc coating on the silver film and the outer butadiene-styrene co-polymer base coating was tested for 16 days in an atmosphere of 100% humidity at 125° F. before any failure or loss of reflectivity occurred.

Test III

The procedure outlined above for Test I was repeated, but omitting the zinc oxide film. The mirror lost its brilliance within three and one half days under 100% relative humidity at 112° F.

Test IV

Shellac backing, formerly used extensively as a mirror backing, was applied to a silvered mirror without any intermediate or other coatings, and it offered protection for less than one day exposed to an atmosphere of 100% relative humidity at 112° F.

Test V

With only the zinc oxide film to protect it, (no other coatings used), the silvered mirror maintained its initial brilliance and adherence for three days at 112° F., 100% relative humidity.

Test VI

With no protective coatings of any kind, the silvered mirror lost its brilliance and adherence in one day at 112° F., 100% relative humidity.

Test VII

A mirror containing only the protective organic coating, described in this application, on its back lost its brilliance within three days under an atmosphere of 100% humidity at 125° F.

In view of the above results, it is, thus, apparent that a mirror containing only the zinc oxide coating would withstand a high humidity and temperature for only three days and, likewise, a mirror containing only the outer organic-base coating. However, when the mirror contained the combination backing of zinc coating and the outer organic coating, it could withstand high temperature and humidity conditions for 16 days and with the primer coating lasted 25 days or more. Whereas the protection offered by the zinc oxide deposit is limited in the absence of the organic base primer and outer coatings, the same organic coatings over the zinc oxide deposit offer protection longer than when used alone. In other words, the protection of the combination zinc oxide plus organic backings is much superior to that offered by organic coatings without the zinc oxide primer. These results are obviously synergistic. It is not precisely known why the combinations of these layers should offer such remarkable protection for the thin silver film, since the oxide layer is only baked chemically precipitated zinc oxide and the outer organic base coating consists only of zinc oxide, barytes, talc, titanium dioxide, and butadiene-styrene co-polymer. It is believed that possibly some chemical or physical reaction occurs between either the zinc and the silver film or the zinc and the organic-base coatings, or both, such that a new chemical compound or compounds are formed or a different association of compounds or elements is provided for even on slight scratching the silver film does not oxides. Hence the zinc may be in the form of $Ag_xZn_yO_z$ where $x$, $y$ and $z$ are at least one and the zinc oxide protects the silver film by the oxide radical absorbing moisture that may pass through the organic coatings, or combining with the organic coatings in a manner so as to resist moisture penetration, or by the zinc radical combining with the silver to form a complex silver-zinc salt which resists moisture and oxidation. It is, thus, not precisely known why the zinc film proves to be so protective since it is only zinc oxide. However, merely using powdered zinc oxide or a water or organic solvent suspension thereof will not result after heating and baking in the type of coating produced herein.

The zinc oxide film is also very tenaciously attached to the silver and in no manner damages the excellent adherence of the silver or other metal film to the glass. For example, if, to a poorly silvered mirror, an adhesive tape is attached and pulled, the tape will remove the silver film from the glass. A properly prepared mirror has such a good metal-to-glass bond that adhesive tape cannot detach the metal film. If the same test is applied to properly prepared mirrors that have received the zinc oxide film of this invention, it will be found that the adhesive is thoroughly attached to the zinc oxide film, and only the tape is removed and that without damage to the mirror. This example is presented as evidence of the fact that the zinc oxide film in no way damages a well- and properly-prepared mirror. The robbing of the adhesive by the zinc oxide film is evidence of an important property that it has for improving mirrors in that it is an excellent base on which to apply the primer or outer organic base coatings which are greatly adherent thereto.

On handling, cutting and edge-polishing in manufacturing and assembling operations the composite coating (zinc oxide plus butadiene-styrene composition) was not readily marred or scratched and the silver film did not flake or peel from the glass. Moreover, the combination backing is not only tough but also friable so that it can be readily cut by the usual glass-cutting methods and break free with the glass, as well as be edge-polished without causing the silver to flake or peel.

It will be appreciated that according to the prior art, electrocopper-backed mirrors offer outstanding performance in customary accelerated tests and in service conditions. Mirrors, so backed, derive benefit from galvanic protection offered by the copper and depend for long life upon the organic backing or backings applied over the copper. A mirror with only the customary thickness of electrocopper backing for protection, resists deterioration for about three days in the accelerated humidity test at 125° F.—100 per cent relative humidity. With suitable orangic coatings, known to the art, over the electrocopper coatings, deterioration resistance is extended to about 30 days.

Application of electrocopper introduces an expensive step in mirror manufacture, so that the cost of the product is appreciably increased. It is seen that the mirror of the present invention is comparable in quality to electrocopper-backed mirrors, and that its manufacture includes no expensive electrolytic operation.

Furthermore, electrocopper-backed mirrors when examined in bright sunlight, show a "dusty" appearance that is not visible in artificial light. The cause for such "dusty" appearance is not directly known, but obviously it is associated with the electrocoppering step. Mirrors without electrocopper, but with the same organic backings do not, when new, show that "dusty" appearance. But, these latter mirrors of commerce then resist deterioration for only about 17 days in the accelerated humidity test at 125° F.—100 per cent relative humidity.

The following data further show the improved performance offered by the article of the invention described herein.

cludes electrocopper; No. 5B same source as 5A, but containing no electrocopper. The notations "with" and "without mastic" refer to the practice of using mastic for attachment of mirrors when mounting them in certain types of installation. Mastics introduce variables that modify corrosive effects of atmospheres.

In summary, it is apparent that a new and novel method of protecting mirrors has been devised as well as a new and novel combination backing, that is, a mirror containing an adherent protective coating of a chemically precipitated baked metallic oxide to which is intimately bound an outer organic-base coating composition comprising zinc oxide, barytes, talc, titanium dioxide and styrene-butadiene co-polymer. This combination backing not only protects the mirror against atmospheric moisture and oxidation, even on slight scratching, but also against ordinary abrasion and handling, yet the composition is readily friable and easily cut by a knife or cutting implement so that large sheets of material may be cut into retail or commercial sizes without peeling or flaking the silver from the edges. Likewise, the edges may be polished or tapered without causing the silver to peel away or to break. Moreover, additional mirror life as well as adherence of the outer coating to the metallic oxide layer is obtained when a primer coat is dispersed therebetween.

This application is co-pending with and related to McGraw, Faust and Mueller application Serial No. 164,058, filed May 25, 1950, and McGraw and Faust application Serial No. 164,056, filed May 25, 1950. These are divisional applications of the present case.

While this invention has been described with particular reference to the protection of silvered mirrors, it is to be understood that in its broad concept and scope it is applicable to the protection of all kinds of light-reflecting materials suitable for mirrors or light-transmitting substances and subject in use to deterioration and oxidation by moist air and gases, scratches, flaking and peeling caused by cutting, edge-polishing, handling and so forth, during manufacturing and assembling operations, and, thus, with respect to the scope of the invention the foregoing material is to be considered as illustrative rather than limiting.

*Table*

| Product Tested—Mirrors | Days of Resistance to First Sign of Deterioration in Appearance | | | | | |
|---|---|---|---|---|---|---|
| | Winter-time outdoor exposure Central Ohio— | | | Exposure in 125° F—100% relative humidity— | | |
| | without mastic | with mastic A [1] | with mastic B [2] | without mastic | with mastic A [1] | with mastic B [2] |
| Test 1 | | | | | | |
| New Product of the Present Invention | 50 | 50 | 50 | 25 | 17 | 20 |
| Commercial Product 1 | | | | 3 | | |
| Commercial Product 2 | | | | 4 | | |
| Commercial Product 3 | 7 | 19 | 19 | 7 | 6 | 6 |
| Commercial Product 4A | 70 | 70 | 70 | 18 | 13 | 15 |
| Commercial Product 5A | 61 | 70 | 70 | 28 | 23–25 | 41 |
| Commercial Product 5B | 70 | 20 | 70 | 17 | 14 | 14 |

[1] Mastic A is Palmer Mirro-mastic, Palmer Asbestos and Rubber Corporation.
[2] Mastic B is 3-M Mastic, Minnesota Mining and Manufacturing Company.

Products 1, 2, and 3 are each from different commercial sources and do not include electrocopper. Product No. 4 includes electrocopper. No. 5A is from a different source and also in-

Having thus described the invention, what is claimed as new and novel and is desired to be secured by Letters Patent, is:

1. An article of manufacture, comprising light-permeable material, a light-reflecting back surface layer on said light-permeable material, a coating of a metallic oxide selected from the group consisting of the oxides of aluminum, lead, thallium, tin, and zinc on the back surface of said layer, and an outer, organic-base coating, disposed on the back surface of said oxide coating, and having the following composition:

| | Parts by weight |
|---|---|
| Zinc oxide | from 13 to 33 |
| Barytes | from 16 to 40.5 |
| Talc | from 3.0 to 15.5 |
| Titanium dioxide | from 6.0 to 11.0 |
| Styrene butadiene co-polymer | from 25 to 32 |

2. An article of manufacture in accordance with claim 1 wherein said light-reflecting layer is selected from the group consisting of copper, gold, silver and platinum.

3. A mirror, comprising a glass base, a reflecting silver film on the back side of said glass base, an intimately adherent zinc oxide layer on said silver film, and an outer organic-base coating, disposed on the back side of said oxide layer, and having the following composition:

| | Parts by weight |
|---|---|
| Zinc oxide | from 13 to 33 |
| Barytes | from 16 to 40.5 |
| Talc | from 3.0 to 15.5 |
| Titanium dioxide | from 6.0 to 11.5 |
| Styrene butadiene co-polymer | from 25 to 32 |

4. A mirror in accordance with claim 3 in which a primer coating comprising essentially vinyl butyral resin, basic zinc chromate, talc, and phosphoric acid is disposed between the oxide layer and the outer organic-base coating.

5. An article of manufacture in accordance with claim 1 wherein said metallic oxide layer is composed of zinc oxide.

6. An article of manufacture in accordance with claim 1 wherein said light-reflecting layer is metallic.

7. An article of manufacture in accordance with claim 6 wherein said metallic oxide layer is composed of zinc oxide.

LESLIE D. McGRAW.
CHARLES L. FAUST.
ERNEST R. MUELLER.

REFERENCES CITED

The following references are of record in the file of this patent:

UNITED STATES PATENTS

| Number | Name | Date |
|---|---|---|
| 2,294,940 | Skolnik | Sept. 8, 1942 |
| 2,394,930 | McRae | Feb. 12, 1946 |
| 2,410,733 | Hewlett | Nov. 5, 1946 |
| 2,468,568 | McCuster | Apr. 26, 1949 |
| 2,482,054 | Colbert et al. | Sept. 13, 1949 |
| 2,495,762 | Porter | Jan. 31, 1950 |

FOREIGN PATENTS

| Number | Country | Date |
|---|---|---|
| 397,397 | Great Britain | Aug. 24, 1933 |